(12) United States Patent
Koepnick et al.

(10) Patent No.: US 7,993,484 B2
(45) Date of Patent: Aug. 9, 2011

(54) TWO-COMPONENT STRUCTURAL ADHESIVE HAVING HIGH INITIAL ADHESION

(75) Inventors: Friedhelm Koepnick, Duesseldorf (DE); Martin Majolo, Erkelenz (DE); Horst Beck, Neuss (DE)

(73) Assignee: Henekl AG & Co. KGaA, Duesseldorf (DE)

( * ) Notice: Subject to any disclaimer, the term of this patent is extended or adjusted under 35 U.S.C. 154(b) by 1559 days.

(21) Appl. No.: 11/384,184

(22) Filed: Mar. 17, 2006

(65) Prior Publication Data

US 2006/0157196 A1  Jul. 20, 2006

Related U.S. Application Data

(63) Continuation of application No. PCT/EP2004/010006, filed on Sep. 8, 2004.

(30) Foreign Application Priority Data

Sep. 17, 2003  (DE) .................................. 103 43 090

(51) Int. Cl.
  C09J 4/00    (2006.01)
  C08L 1/00    (2006.01)
  C08L 3/00    (2006.01)
  C08L 5/00    (2006.01)
  C09D 103/00  (2006.01)
  D21H 19/54   (2006.01)
  C09D 105/00  (2006.01)

(52) U.S. Cl. .............. 156/336; 524/27; 524/31; 524/47; 106/162.1; 106/163.01

(58) Field of Classification Search .................... 524/27, 524/31, 47; 156/336; 106/162.1, 163.01
See application file for complete search history.

(56) References Cited

U.S. PATENT DOCUMENTS

| | | | |
|---|---|---|---|
| 4,069,062 A | 1/1978 | Bürge | |
| 4,883,536 A | 11/1989 | Burdick | |
| 4,931,494 A | 6/1990 | Auchter et al. | |
| 5,228,908 A | 7/1993 | Burdick et al. | |
| 5,433,775 A * | 7/1995 | Gardenier et al. | 106/206.1 |
| 6,770,706 B2 | 8/2004 | Lewin et al. | |
| 2002/0195024 A1 * | 12/2002 | Ayambem et al. | 106/184.3 |
| 2003/0144405 A1 * | 7/2003 | Lewin et al. | 524/493 |

FOREIGN PATENT DOCUMENTS

| | | |
|---|---|---|
| DE | 2 417 086 | 11/1974 |
| DE | 37 20 860 A1 | 1/1989 |
| DE | 689 18 789 T2 | 2/1995 |
| DE | 691 10 403 T2 | 10/1995 |
| DE | 101 16 023 A1 | 10/2001 |
| DE | 101 59 782 A1 | 7/2002 |
| DE | 101 46 056 A1 | 8/2002 |
| GB | 2061990 A * | 5/1981 |

OTHER PUBLICATIONS

ASTM 3418/82, "Transition Temperaturs of Polymers by thermal Analysis", ASTM International. pp. 1-5 (Mar. 1988).
DIN 55945, "Paints and varnishes—Terms and definitions for coating materials", DIN Deutsches Institut Für Normung e.v., pp. 1-11 (Jul. 1999).

* cited by examiner

*Primary Examiner* — David Wu
*Assistant Examiner* — Vu A Nguyen
(74) *Attorney, Agent, or Firm* — James E. Piotrowski

(57) ABSTRACT

Two-component assembly adhesives with high early tack, with component A containing 0.5 to 50% of polysaccharides, water, and water-soluble salt, and component B containing water, water-soluble salt, and polysaccharides, the adhesive also containing a water-soluble, water-dispersible polymer.

10 Claims, No Drawings

TWO-COMPONENT STRUCTURAL ADHESIVE HAVING HIGH INITIAL ADHESION

CROSS REFERENCE TO RELATED APPLICATIONS

This application is a continuation under 35 U.S.C. §365(c) and 35 U.S.C. §120 of international application PCT/EP04/010006, filed on Sep. 8, 2004. This application also claims priority under 35 U.S.C. §119 of DE 103 43 090.3, filed Sep. 17, 2003, which is incorporated herein by reference in its entirety.

BACKGROUND OF THE INVENTION

This invention relates to a water-based two-component assembly adhesive with high early tack, at least one component containing a proportion of a low molecular weight compound dissociating in water.

The use of adhesives in the manufacture of industrial goods and in the DIY field is increasingly replacing mechanical fixings and fastenings. This is particularly the case where the joint between two workpieces is only exposed to moderate mechanical loads. So-called assembly adhesives are often distinguished by high early tack, which enables them rapidly to fix even relatively heavy workpieces.

Today, solvent-based assembly adhesives are being increasingly replaced by water-based assembly adhesives. The main advantages of the water-based adhesives over the solvent-based adhesives lie in improved processing properties, increased ageing resistance and, not least, in the absence of environmentally harmful and health-endangering solvents.

However, these advantageous water-based assembly adhesives also have to satisfy requirements in regard to adhesive performance and particularly in regard to the early tack of the assembly adhesive. Where assembly adhesives are used, bonded workpieces generally have to be kept in the required position by mechanical fixing in the initial phase of the bonding process. However, this results in increased effort in the use of assembly adhesives and is often found to be troublesome by users. However, there would be no need for such fixing if the early tack of the assembly adhesives used were high enough.

The early tack of the water-based assembly adhesives known from the prior art is often influenced by the use of thickeners, which, unfortunately, greatly increase the viscosity of the adhesives. This high viscosity necessitates correspondingly resistant, high-performance stirrers, which are capable of reliably mixing such highly viscous products. However, the performance of the mixers/stirrers for adhesives imposes a limit on known assembly adhesives in regard to their viscosity and hence in regard to the strength of the early tack.

In addition, however, an upper limit is also placed on the maximum viscosity by the processing properties of such adhesives. Even the discharge of high-viscosity adhesives from an appropriate container, for example a tube or a cartridge, can be complicated by an excessive viscosity of the adhesive to such an extent that, despite possibly high early tack, the user finds this to be such a disadvantage that he turns to other products.

DE 691 10 403 T2 describes aqueous suspensions of nonionic polymers in a salt medium. The described suspensions contain, for example, cellulose derivatives as the nonionic polymers and sodium formate as the salt, the suspensions having to contain at least 28% by weight sodium formate. However, salt concentrations as high as these are not suitable for the use of the described suspensions in two-component adhesives.

DE 689 18 789 T2 relates to a suspension of water-soluble polymers in aqueous media containing dissolved salts and describes, for example, suspensions of cellulose derivatives in aqueous solutions of ammonium salts, the ratio by weight of ammonium salt to water being at least 0.15:1. However, the described salt concentration is too high for the use of the described suspensions in two-component adhesives.

DE OS 2 417 086 relates to additives for mortars and concrete in the form of aqueous dispersions and describes aqueous dispersions of water-soluble substances, the dispersion medium used being a solution of salts or organic solvents in which the substances are insoluble or only partly soluble. According to the Examples, a 25% by weight solution of aluminium sulfate, for example, is used for the dispersion of hydroxyethyl cellulose while an ethylene oxide polymer is dispersed in a 15% by weight solution of sodium sulfate. The described dispersions are also unsuitable for use in two-component adhesives.

DE 101 16 023 discloses, for example, a water-based assembly adhesive based on an aqueous styrene/alkyl acrylate dispersion. The use of salts is not mentioned in this document.

Besides liquid, water-based assembly adhesives, assembly adhesive powders are known from the prior art and have to be mixed with a suitable solvent by the user before application. However, adhesive powders have disadvantages in regard to storage and application. On the one hand, the processing of such fine powders is attended by the emission of dusts, which are harmful to health if inhaled; on the other hand, unwanted lumps are also easily formed when the powder is mixed in a solvent.

Accordingly, there was a need for assembly adhesives, which would show, improved early tack in relation to known assembly adhesives.

In addition, there was a need for assembly adhesives, which, despite high early tack, would still allow correcting movements to be made at the beginning of the bonding process.

There was also a need for assembly adhesives, which would be simple and safe to use.

There was also a need for environmentally friendly and physiologically safe assembly adhesives.

In addition, there was a need for assembly adhesives with high early tack, which would be easy to discharge from a corresponding adhesive container with little effort.

There was also a need for a process for the production of assembly adhesives with improved early tack, which, in addition, would optionally be easy to handle, environmentally friendly and physiologically safe.

Accordingly, the problem addressed by the present invention was to provide assembly adhesives which would satisfy one or, more preferably, more or all of the above-mentioned requirements.

DESCRIPTION OF THE INVENTION

Accordingly, the present invention relates to a two-component assembly adhesive comprising components A and B, in which component A contains at least one water-soluble polysaccharide or a mixture of two or more water-soluble polysaccharides in a quantity of 0.5 to 50% by weight, based on the total weight of component A, water and
a compound dissociating in water, which reduces the solubility in water of at least one water-soluble polysaccharide present in component A
and component B contains
water
optionally a compound dissociating in water which reduces the solubility in water of a water-soluble polysaccharide present in component A and
optionally a water-soluble polysaccharide or a mixture of two or more water-soluble polysaccharides;
at least component A or component B containing a synthetic polymerizate insoluble, but dispersible, in water and
the concentration of the compound dissociating in water in component A being so high that the solubility of at least one of the water-soluble polysaccharides present in component A is reduced and
the concentration of the compound dissociating in water in components A and B being so high overall that the solubility of at least one of the water-soluble polysaccharides present in component A after components A and B have been combined is higher than in component A alone.

In the context of the present invention, a two-component assembly adhesive is understood to be an adhesive system, which consists of two components present separately from one another.

To obtain a bond with high early tack, the individual components may be mixed, for example, before application to the surfaces to be bonded. Mixing may be carried out, for example, by hand by applying the individual components, for example, to a surface and mixing them by hand on that surface, for example using a spatula. The surface may be, for example, one of the surfaces to be bonded. However, it is also possible in accordance with the invention initially to mix the two adhesive components on any surface and then to apply the resulting mixture to the surfaces to be bonded.

In another embodiment of the invention, the adhesive components are individually applied to and mixed on the surfaces to be bonded, so that the two adhesive components A and B only come into contact with one another when the two surfaces to be bonded are joined together.

According to the invention, the two components A and B, if present separately from one another, do not both have to have adhesive properties. In one embodiment of the invention, for example, only one of the two components A or B has adhesive properties. The component in question is preferably the component, which contains the synthetic polymerizate or a mixture of two or more synthetic polymerizates.

In the context of the invention, the early tack of an adhesive is understood to be its adhesion as measured immediately after application to the workpiece to be bonded. The measurement of early tack is carried out as follows: a length of beech plywood (150×30×4 mm), which has an 8 mm diameter hole to receive the hook of a spring balance in one of the narrow sides, is coated with the adhesive to be tested over a length of 100 mm and a width of at least 20 mm starting from the hole-free narrow sides. The layer thickness of the adhesive must be at least ca. 2 mm. In order to guarantee the necessary layer thickness, four steel balls 2 mm in diameter are placed in the strand of adhesive. To measure early tack, a test strip of eloxated aluminium (150×15×1 mm) is placed on the adhesive layer and then pressed in until it comes into contact with the steel balls. The bonded overlap area measures 10×1.5 cm (15 cm$^2$). The test strip of eloxated aluminium also has an opening to receive the hook of a spring balance in its narrow end facing the bonded area. The measuring unit thus produced is suspended from the spring balance (500 g spring balance) at its wood end and the aluminium strip is pulled slowly downwards. The moment the aluminium strip begins to slip on the adhesive, the value is read off from the spring balance and noted. To calculate the early tack, the value read off is divided by the bonded area (15 cm$^2$) which gives the early tack in g/cm$^2$.

Component A of an adhesive system according to the invention contains at least one water-soluble polysaccharide or a mixture of two or more water-soluble polysaccharides in a quantity of ca. 05 to ca. 50% by weight, based on the total weight of component A.

Water-soluble polysaccharides suitable for the purposes of the invention are, basically, any polysaccharides or polysaccharide derivatives providing they are at least partly soluble in water. A polysaccharide is understood to be any molecule which contains at least ca. 5 to 10 glycosidically linked sugar molecules. Polysaccharides suitable for the purposes of the present invention contain, for example, ca. 100 to ca. 100,000 glycosidically linked sugar molecules. The degree of branching of the polysaccharides suitable for the purposes of the invention can be very different, for example on the basis of the ratio of the beta-1,4- and 1,6-glycosidic linkages and their arrangement relative to one another. Both polysaccharides of animal origin and polysaccharides of vegetable origin and also synthetic polysaccharides are suitable for the purposes of the present invention. According to the invention, the polysaccharides may undergo any desired technical modifications, for example methylation, carboxylation, hydroxymethylation, hydroxyethylation and the like.

For example, the water-soluble polysaccharides starch, xanthan gum, guar guar, agar agar, alginates and tyloses, carboxymethyl cellulose and hydroxyethyl cellulose and derivatives of the above-mentioned polysaccharides are suitable for the purposes of the invention.

The starch or the basis of the starch derivatives may be selected from any types of starch, such as potato starch, corn starch, wheat starch, rice starch, milo starch, tapioca starch or mixtures of two or more of the starches mentioned and the like. In a preferred embodiment of the present invention, starch or starch derivatives based on potato or corn starch or mixtures thereof are used.

The starch must be soluble in water for the purposes of the present invention. Modified starch is particularly suitable for the purposes of the present invention, a corresponding modification being achieved by physical or slight chemical action. Actual examples of such starch derivatives are partially degraded starch and pregelatinized starch.

The starch derivatives should be soluble in water. Starch esters or starch ethers, above all carboxylated or alkoxylated starches, are particularly suitable water-soluble starch derivatives. Suitable carboxylated or alkoxylated starches are any of the correspondingly modified natural starch types mentioned in the foregoing. Useful starch derivatives have a degree of carboxylation of ca. 0.1 to ca. 2.0 or a degree of alkoxylation of ca. 0.05 to ca. 1.5.

Suitable cellulose compounds besides natural cellulose are, in particular, the cellulose ethers. Suitable cellulose ethers are, for example, carboxymethyl cellulose (CMC), carboxymethyl methyl cellulose (CMMC), ethyl cellulose (EC), hydroxypropyl cellulose (HPC), hydroxypropyl methyl cellulose (HPMC), hydroxybutyl cellulose (HBC), hydroxybutyl methyl cellulose (HBMC), hydroxyethyl cellulose (HEC), hydroxyethyl carboxymethyl cellulose (HECMC), hydroxyethyl ethyl cellulose (HEEC), hydroxypropyl cellulose (HPC), hydroxypropyl carboxymethyl cellulose (HPCMC), hydroxypropyl methyl cellulose (HPMC), hydroxyethyl methyl cellulose (HEMC), methyl hydroxyethyl cellulose (MHEC), methyl hydroxyethyl propyl cellulose (MHEPC), methyl cellulose (MC) and propyl cellulose (PC), carboxymethyl cellulose, methyl cellulose, methyl hydroxyethyl cellulose and methyl hydroxypropyl cellulose and mixtures of two or more thereof and the alkali metal salts of CMC and the lightly ethoxylated MC or mixtures of two or more of the compounds mentioned being preferred.

In a preferred embodiment of the present invention, the water-soluble polysaccharide or a mixture of two or more water-soluble polysaccharide derivatives is selected from the group consisting of cellulose and cellulose derivatives, more particularly methyl cellulose, starch and starch derivatives, guar and guar derivatives, xanthan gum and xanthan gum derivatives. A particularly preferred embodiment of the invention is characterized by the use of methyl cellulose or a methyl cellulose derivative or a mixture thereof.

A component A usable in accordance with the invention may contain, for example, only one polysaccharide or polysaccharide derivative. However, a component A usable in accordance with the invention may also contain two or more polysaccharides or polysaccharide derivatives, for example 3, 4, 5, 6 or 7 polysaccharides or polysaccharide derivatives or mixtures thereof.

According to the invention, component. A contains 0.5 to 50% by weight of water-soluble polysaccharides or water-soluble polysaccharide derivatives or mixtures thereof, based on the total weight of component A. In a preferred embodiment of the present invention, component A contains ca. 5 to ca. 40% by weight or ca. 10 to ca. 30% by weight of water-soluble polysaccharides or water-soluble polysaccharide derivatives. In a particularly preferred embodiment, component A contains ca. 15 to ca. 25% by weight, for example ca. 18 to ca. 23% by weight or ca. 20 to ca. 22% by weight of water-soluble polysaccharides or water-soluble polysaccharide derivatives.

Component A also contains water. The water content of component A may be, for example, ca. 1% by weight to ca. 80% by weight, based on the total weight of component A, and is preferably from ca. 5 to ca. 70% by weight and more particularly from ca. 15 to ca. 65% by weight. Components A with a water content of ca. 40 to ca. 60% by weight are particularly suitable.

Besides water, component A may also contain a water-soluble or water-miscible solvent or mixtures of two or more additional water-soluble or at least water-miscible solvents.

Together with water, basically any water-miscible or water-soluble solvents may be used for the purposes of the invention. Suitable solvents may, for example, influence the solubility of the polysaccharides or polysaccharide derivatives in water, but do not have to do so.

Suitable additional solvents are, for example, water-soluble or water-miscible mono- or polyhydric alcohols, more particularly di- or trihydric alcohols, water-soluble or water-miscible ethers, more particularly polyethers, or water-soluble or water-miscible ketones.

The quantity of additional solvents in component A is, for example, from ca. 0 to ca. 40% by weight, based on the total weight of water and solvent or solvent mixture in component A, or from ca. 0.2 to ca. 20% by weight or from ca. 1 to ca. 10% by weight.

In addition, component A contains at least one low molecular weight compound dissociating in water. In the context of the invention, "low molecular weight" compounds are compounds whose molecular weight does not exceed ca. 1,000 g/mol. According to the invention, compounds with a molecular weight of ca. 800 g/mol or lower and, more particularly, ca. 500 g/mol or lower are preferably used as the low molecular weight compounds.

According to the invention, suitable compounds dissociating in water are both organic and inorganic compounds. According to the invention, preferred dissociating compounds are substances which are soluble in water or aqueous solutions in a quantity of at least 10 g/l, but preferably higher, for example in a quantity of at least ca. 20, 30 or 40 g/l, at 23° C.

In a preferred embodiment of the present invention, ammonium salts or metal salts, more particularly salts of alkali or alkaline earth metals, are used as the dissociating compounds. Salts of Li, Na, K, Mg or Ca, more especially the salts of Na or K, are particularly suitable for the purposes of the invention.

Suitable anions may be mono- or polyvalent. Halides, such as chlorides or bromides, carbonates, hydrogen carbonates, sulfates, hydrogen sulfates, sulfites, phosphates or phosphites are particularly suitable.

In addition, metal or ammonium salts of monobasic or polybasic acids, for example dibasic, tribasic or tetrabasic acids, may be used for the purposes of the invention. For example, salts of carboxylic acids, such as citric acid or formic acid or acetic acid, are suitable. It has been found to be favorable for the purposes of the invention to use a salt of a polybasic acid, for example a salt of citric acid.

In another embodiment of the present invention, sodium carbonate, sodium citrate, sodium formate or sodium sulfate, for example, or two or more of the salts mentioned are advantageously used as a constituent of component A.

Component A contains salt in a quantity at which the concentration of the compound dissociating in water in component A is so high that the solubility of at least one of the water-soluble polysaccharides present in component A is reduced. The quantity of dissociating compounds in component A is preferably selected so that the water-soluble polysaccharide is present in component A in undissolved or only partly dissolved form. A minimal dissolved quantity of polysaccharides in component A is preferred. According to the invention, however, ca. 5, 10, 30, 50, 70, 80, 90% of the polysaccharides may also be dissolved in component A.

Basically, therefore, the lower limit to the concentration of compounds dissociating in water in component A may be determined as the quantity at which only a small part of the polysaccharides present in component is prevented from dissolving. However, such a small quantity of dissociating compounds in component A generally does not produce a sufficient reduction in the viscosity of component A. In a preferred embodiment of the invention, the concentration of compounds dissociating in water in component A reduces the dissolution of the polysaccharides or polysaccharide derivatives at least to such an extent that their solubility amounts to less than ca. 50%, based on the solubility in the same quantity of water without dissociating compounds. In a preferred embodiment, the solubility is less than ca. 30% and, more particularly, less than ca. 10%.

Basically, the content of compounds dissociating in water in component A in this connection may be up to ca. 50% by weight. According to the invention, however, the salt content is, for example, from ca. 0.1 to ca. 20% by weight or ca. 1 to ca. 10% by weight, more particularly from ca. 2 to ca. 5% by weight or from ca. 3 to ca. 4% by weight, based on the total weight of component A.

Besides component A, the two-component assembly adhesive according to the invention also comprises a component B, component B containing at least water and optionally a compound dissociating in water which reduces the solubility in water of a water-soluble polysaccharide present in component A and optionally a water-soluble polysaccharide or a mixture of two or more water-soluble polysaccharides.

The only substance compulsorily present in component B is water. According to the invention, therefore, component B may consist entirely of water. In a preferred embodiment of the invention, however, component B contains one or more other compounds.

For example, in addition to water, component B may also contain a water-soluble polysaccharide or a mixture of two or more water-soluble polysaccharides or polysaccharide derivatives. Such polysaccharides or polysaccharide derivatives are suitable, for example, for adjusting the consistency of component B in regard to viscosity or optionally other rheological properties. Suitable polysaccharides or polysaccharide derivatives or mixtures thereof are the polysaccharides or polysaccharide derivatives already described in the foregoing text.

So far as the quantity of polysaccharides or polysaccharide derivatives in component B is concerned, it is smaller, based on the water content of component B, than the quantity of polysaccharides in component A. According to the invention, therefore, the polysaccharide or polysaccharide derivative content of component B is at most ca. 20% by weight, based on component B as a whole, and more particularly at most ca. 10% by weight. Suitable contents are, for example, in the range from ca. 0.1 to ca. 8% by weight, for example in the range from ca. 1 to ca. 5% by weight.

In addition, component B may contain a compound dissociating in water or a mixture of two or more compounds dissociating in water. The compounds dissociating in water mentioned above and especially the salts mentioned above are particularly suitable.

So far as the content of dissociating compounds in component B is concerned, there is an upper limit resulting from the behavior of the mixed components A and B. The effect according to the invention of a distinct improvement in early tack is present in particular when the solubility of the polysaccharides or polysaccharide derivatives or the mixtures of polysaccharides and polysaccharide derivatives present in total in component A and component B in the mixture of components A and B is higher than the solubility of the polysaccharide derivatives present in component A in that component alone.

Accordingly, the compound dissociating in water or a mixture of two or more such compounds is present in component B in at most a quantity which increases the solubility of the water-soluble polysaccharides from component A in a mixture of components A and B as compared with the solubility of the polysaccharides from component A when component A is present separately from component B. The solubility of the water-soluble polysaccharides is always based on water as solvent.

Accordingly, component B according to the invention is distinguished from component A in particular by the fact that it contains a smaller quantity of dissociating compound or no compound dissociating in water.

Component B preferably has a higher water content than component A.

For example, component B may contain only water. This case is only ruled out when component A does not contain a polymerizate insoluble, but dispersible, in water.

This means that a two-component assembly adhesive according to the present invention must contain at least one polymerizate insoluble, but dispersible, in water either as a constituent in component A or as a constituent of component B or as a constituent of both components.

According to the invention, component B contains at least 10% by iweight water, based on the total weight of component B, preferably ca. 20 to 70% by weight water and more particularly ca. 30 to ca. 50% by weight water, based on the total weight of component B.

According to the invention, at least one component A or component B contains at least one synthetic polymerizate insoluble, but dispersible, in water. A "polymerizate" in the context of the present invention is understood to be a compound obtainable by polymerization, more particularly by radical polymerization, of monomers containing at least one olefinically unsaturated double bond. Accordingly, the term "polymerizate" as used in the present specification in connection with the above-mentioned synthetic polymerizate insoluble, but dispersible, in water is used synonymously with the term "polymer" unless otherwise specifically stated.

According to the invention, one of the two components contains either one such water-dispersible polymer or a mixture of two or more such water-dispersible polymers. In another embodiment of the invention, however, both component A and component B each contain one such water-dispersible polymer or a mixture of two or more such water-dispersible polymers. In a preferred embodiment of the invention, only one of the two components contains one such water-dispersible polymer or a mixture of two or more such water-dispersible polymers, more particularly component A.

Basically, any polymer known to the expert which is dispersible in water or aqueous solutions, but insoluble in water, may be used as the water-insoluble, water-dispersible polymer. For example, this polymer may be a single polymer or a mixture of two or more polymers.

Basically, the polymer may be selected in particular from homo- and copolymers of vinyl esters, styrene, acrylates and vinyl chloride.

Vinyl ester polymers suitable as polymers are, for example, vinyl acetate homopolymers, copolymers of vinyl acetate with ethylene and/or vinyl chloride and/or other vinyl esters, such as vinyl laurate, versatic acid vinyl esters, vinyl pivalate or esters of maleic acid or fumaric acid or copolymers of two or more of the monomers mentioned or homopolymers of vinyl esters of saturated $C_{3-8}$ alkyl carboxylic acids or copolymers thereof with ethylene, vinyl chloride or other vinyl esters.

The acrylates, methacrylates or styrene polymers mentioned above are derived from the polymerization of styrene or esters of acrylic or methacrylic acid. Esters with linear or branched or cyclic aliphatic $C_{1-20}$ alcohols are preferably used as the acrylic or methacrylic acid esters.

Other styrene polymers can be, for example, copolymers of styrene with one or more other monomers.

Overall, acrylic acid/styrene copolymers, methacrylic acid/styrene copolymers or styrene/butadiene copolymers, for example, are suitable. Suitable vinyl chloride polymers are vinyl chloride/ethylene copolymers.

For example, vinyl acetate homopolymers, vinyl acetate/ethylene copolymers or copolymers of vinyl esters of saturated alkyl carboxylic acids and ethylene with an ethylene content of 1 to ca. 40% by weight ethylene and 0 to ca. 40% by weight of other vinyl esters from the group of vinyl esters of saturated $C_{3-8}$ alkyl carboxylic acids or vinyl chloride or mixtures of two or more thereof, styrene acrylates, such as styrene/butyl acrylate or styrene/ethylhexyl acrylate, with a styrene content of 1 to 70% by weight are used for the purposes of the invention.

Also suitable are, for example, vinylester homo- or copolymers, for example with ethylene, of which the basic monomeric unit is a vinyl ester of a linear or branched carboxylic acid containing ca. 2 to ca. 44 carbon atoms, for example ca. 3 to ca. 15 carbon atoms. Suitable monomers for these homo- or copolymeric polyvinyl esters are vinyl formate, vinyl acetate, vinyl propionate, vinyl isobutyrate, vinyl pivalate, vinyl-2-ethyl hexanoate, vinyl esters of saturated branched monocarboxylic acids containing 9 to ca. 15 carbon atoms in the acid component, vinyl esters of relatively long-chain, saturated or unsaturated fatty acids, such as vinyl laurate, vinyl stearate, or vinyl esters of benzoic acid and substituted derivatives of benzoic acid, such as vinyl-p-tert.butyl benzoate. The vinyl esters mentioned may be used individually or in the form of mixtures of two or more of the vinyl esters mentioned in the vinyl ester polymer.

Particularly suitable polymers are, for example, the polymers of alkyl acrylates or alkyl methacrylates with a $C_{1-12}$ alkyl group in the ester part, for example the polymers of methyl methacrylate, methyl acrylate, n-butyl acrylate, ethyl acrylate and 2-ethyl hexyl acrylate. Polymers obtainable by polymerization of mixtures of alkyl acrylates and alkyl (meth)acrylates are also particularly suitable.

Suitable aromatic vinyl compounds for the production of suitable polymers are, for example, vinyl toluene, α- and p-methylstyrene, α-butylstyrene, 4-n-butyl styrene, 4-n-decyl styrene and styrene. Examples of suitable nitriles are acrylonitrile and methacrylonitrile.

In addition, non-aromatic $C_{2-8}$ hydrocarbons containing at least two olefinic double bonds, such as butadiene, isoprene and chloroprene, are suitable for the production of suitable polymers.

Other monomers, which may be present in the polymer in quantities of, for example, 0 to 40% by weight, preferably 0 to 20% by weight and more particularly 0.1 to 10% by weight, are in particular $C_{1-10}$ hydroxyalkyl (meth)acrylates, (meth) acrylamide and derivatives thereof substituted at the nitrogen by $C_{1-4}$ alkyl, ethylenically unsaturated carboxylic acids, dicarboxylic acids, semiesters and anhydrides thereof, for example (meth)acrylic acid, maleic acid, fumaric acid, maleic anhydride, maleic and fumaric acid semiesters and itaconic acid.

A particularly preferred embodiment of the invention is characterized by the use of a polymer containing a polymer of styrene and acrylic acid or styrene and acrylic acid ester. More particularly, a polymer containing a polymer of styrene and an acrylate is used, the styrene making up 50% by weight or more of the mixture used to produce the polymer.

The glass transition temperature of suitable polymers is preferably between −50 and 10° C., for example between −40° C. and −10° C. The minimum film forming temperature (MFT) is ca. 10 to ca. 25° C. and more particularly ca. 15 to ca. 20° C.

The glass transition temperature of the polymer may be determined by standard methods, such as differential thermoanalysis or differential scanning calorimetry (see, for example, ASTM 3418/82, so-called midpoint temperature).

Suitable polymers are produced, for example, by radical polymerization. Suitable polymerization methods, such as bulk, solution, suspension or emulsion polymerization, are known to the expert.

The copolymer is preferably produced by solution polymerization and subsequent dispersion in water or, as in a particularly preferred embodiment, by emulsion polymerization so that aqueous polymer dispersions are formed.

Where emulsion polymerization is used, the monomers can be polymerized as usual in the presence of a water-soluble initiator and an emulsifier at preferably 30 to 95° C.

Suitable initiators are, for example, sodium, potassium and ammonium persulfate, tert butyl hydroperoxide, water-soluble azo compounds or even redox initiators, such as $H_2O_2$/ascorbic acid.

The emulsifiers used include, for example, alkali metal salts of relatively long-chain fatty acids, alkyl sulfates, alkyl sulfonates, alkylated aryl sulfonates or alkylated biphenylether sulfonates. Other suitable emulsifiers are reaction products of alkylene oxides, more particularly ethylene or propylene oxide, with fatty alcohols, acids or phenol or alkylphenols.

In the case of aqueous secondary dispersions, the copolymer is first prepared by solution polymerization in an organic solvent and is then dispersed in water in the presence of salt formers, for example from ammonia to copolymers containing carboxylic acid groups, without using an emulsifier or dispersion aid. The organic solvent can be distilled off. The production of aqueous secondary dispersions is known to the expert and is described, for example, in DE-A-37 20 860.

To adjust molecular weight, regulators may be used in the polymerization reaction. Suitable molecular weight regulators are, for example, —SH-containing compounds, such as mercaptoethanol, mercaptopropanol, thiophenol, thioglycerol, thioglycolic acid ethyl ester, thioglycolic acid methyl ester and tert.dodecyl mercaptan.

The solids content of the polymer dispersions obtained is preferably 30 to 80% by weight and more particularly 35 to 60% by weight.

Accordingly, the present invention also relates to a two-component assembly adhesive which contains a styrene/(meth)acrylate copolymer as the water-insoluble, water-dispersible polymer.

The percentage content of the above-described polymer dispersion in component A is preferably ca. 10 to ca. 80% by weight, based on the total weight of component A, or ca. 20 to ca. 70% by weight or ca. 40 to ca. 60% by weight. The percentage contents mentioned are based on the polymer dispersion as a whole containing polymer, water and additives.

Besides the compounds mentioned above, the components A and B present in an adhesive according to the invention may contain other additives.

Components A and B may comprise up to ca. 70% by weight additives. Basically, one or more additives may be incorporated in component A or component B or in both components in accordance with the invention. Basically, any additive known to the expert for adhesive compositions may be used as required.

Suitable additives are, for example, fillers, plasticizers, defoamers, thickeners, surfactants, anti-sedimenting agents, film-forming aids, preservatives, wetting agents, consistency factors and additional adhesive components, such as dextrins or other ionic cellulose ethers.

Thus, a component A according to the invention or a component B according to the invention may also contain additives. Suitable additives are, in particular, water-soluble ionic or nonionic polymers from the group of polyvinyl pyrrolidones, vinyl pyrrolidone/vinyl ester copolymers, water-soluble amphoteric polymers from the group of alkyl acrylamide/acrylic acid copolymers, alkyl acrylamide/methacrylic acid copolymers, alkyl acrylamide/methyl methacrylic acid copolymers, alkyl acrylamide/acrylic acid/alkylaminoalkyl (meth)acrylic acid copolymers, alkyl acrylamide/methacrylic acid/alkylaminoalkyl(meth)acrylic acid copolymers, alkyl acrylamide/methyl methacrylic acid/alkylaminoalkyl(meth) acrylic acid copolymers, alkyl acrylamide/alkyl methacrylate/alkylaminoethyl methacrylate/alkyl methacrylate copolymers, copolymers of unsaturated carboxylic acids, cationically derivatized unsaturated carboxylic acids, optionally other ionic or nonionic monomers, water-soluble zwitterionic polymers from the group of acrylamidoalkyl trialkylammonium chloride/acrylic acid copolymers and alkali metal and ammonium salts thereof, acrylamidoalkyl trialkyl ammonium chloride/methacrylic acid copolymers and alkali metal and ammonium salts thereof, methacroylethyl betaine/methacrylate copolymers, water-soluble anionic polymers from the group of vinyl acetate/crotonic acid copolymers, vinyl pyrrolidone/vinyl acrylate copolymers, acrylic acid/ethyl acrylate/N-tert.butyl acrylamide terpolymers, graft polymers of vinyl esters, esters of acrylic acid or methacrylic acid individually or in admixture copolymerized with crotonic acid, acrylic acid or methacrylic acid with polyalkylene oxides and/or polyalkylene glycols, grafted and crosslinked copolymers from the copolymerization of at least one monomer of the nonionic type, at least one monomer of the ionic type, polyethylene glycol and a crosslinking agent, copolymers obtained by copolymerization of at least one monomer from each of the three following groups: esters of unsaturated alcohols and short-chain saturated carboxylic acids and/or esters of short-chain saturated alcohols and unsaturated carboxylic acids, unsaturated carboxylic acids, esters of long-chain carboxylic acids and unsaturated alcohols and/or esters of carboxylic acids from the group of saturated or unsaturated, linear or branched $C_{8-18}$ alcohols, terpolymers of crotonic acid, vinyl acetate and an allyl or methallyl ester; tetra- and pentapolymers of crotonic acid or allyloxyacetic acid, vinyl acetate or vinyl propionate, branched allyl or methallyl esters, vinyl ethers, vinyl esters or linear ailyl or methallyl esters, crotonic acid copolymers with one or more monomers from the group consisting of ethylene, vinyl benzene, vinyl methyl ether, acrylamide and water-soluble salts thereof, terpolymers of vinyl acetate, crotonic acid and vinyl esters of a saturated aliphatic α-, β- or γ-branched monocarboxylic acid; water-soluble cationic polymers from the group of quaternized cellulose derivatives, polysiloxanes containing quaternary groups, cationic guar derivatives, polymeric dimethyl diallyl ammonium salts and copolymers thereof with esters and amides of acrylic acid and methacrylic acid, copolymers of vinylpyrrolidone with quaternized derivatives of dialkyl aminoacrylate and methacrylate, vinyl pyrrolidone/methoimidazolinium chloride copolymers, quaternized polyvinyl alcohol, polymers known by the INCI names of Polyquaternium 2, Polyquaternium 17, Polyquaternium 18 and Polyquaternium 27.

According to the invention, the percentage content of such additives in component A is ca. 0 to ca. 70% by weight, for example ca. 1 to ca. 50% by weight or ca. 5 to ca. 40% by weight, based on the total weight of component A.

In another embodiment of the present invention, suitable fillers are, for example, carbonates (particularly calcium carbonate), silica flour, silicates (for example talcum, clay, mica), heavy spar, chalk, silica, sulfates, such as calcium or barium sulfate, or aluminium hydroxide.

These fillers may be present in component A according to the invention in a quantity of, for example, up to ca. 60% by weight, for example in a quantity of ca. 0 to ca. 20% by weight or ca. 20 to ca. 50% by weight, based on component A as a whole. For example, ca. 5 to ca. 10% by weight chalk may be incorporated in component A.

The fillers are preferably finely ground fillers, more particularly chalk, with a mean particle diameter of generally 2 to 10 μm. Silica flour is preferably used with a mean particle diameter of 3 to 20 μm.

According to DIN 55945, the plasticizers suitable as an additive for the purposes of the present invention are liquid or solid, inert organic substances with a low vapor pressure. By virtue of their dissolving and swelling capacity, they are able to reduce the hardness of the polymer and to increase its adhesion.

Preferred plasticizers include adipic and sebacic acid plasticizers, phosphorus acid plasticizers, citric acid plasticizers, fatty acid esters and epoxidized fatty acid esters, fatty alcohols, propylene glycol, polyethylene glycol, benzoates or phthalates or mixtures of two or more thereof.

In addition, anionic, cationic or ampholytic surfactants or mixtures of two or more thereof may be present in a component A according to the invention. Examples of suitable anionic surfactants are alkyl sulfates, particularly those with a chain length of ca. 8 to ca. 18 carbon atoms, alkyl and alkaryl ether sulfates containing ca. 8 to ca. 18 carbon atoms in the hydrophobic part and 1 to ca. 10 ethylene oxide (EO) or propylene oxide (PO) units, or a mixture thereof, in the hydrophilic part of the molecule, sulfonates, particularly alkyl sulfonates, containing ca. 8 to ca. 18 carbon atoms, alkylaryl sulfonates containing ca. 8 to ca. 18 carbon atoms, taurides, esters and semiesters of sulfosuccinic acid with monohydric alcohols or alkylphenols containing 4 to ca. 15 carbon atoms, which may optionally be ethoxylated with 1 to ca. 20 EO units, alkali metal and ammonium salts of carboxylic acids, for example of fatty acids or resin acids containing ca. 8 to ca. 32 carbon atoms or mixtures thereof, phosphoric acid partial esters and alkali metal and ammonium salts thereof.

Examples of cationic surfactants are salts of primary, secondary or tertiary fatty amines containing ca. 8 to ca. 24 carbon atoms with acetic acid, sulfuric acid, hydrochloric or phosphorus acids, quaternary alkyl and alkyl benzene ammonium salts, particularly those of which the alkyl groups contain ca. 6 to ca. 24 carbon atoms, more especially the halides, sulfates, phosphates or acetates, or mixtures of two or more thereof, alkyl pyridinium, alkyl imidazolinium or alkyl oxazolidinium salts, particularly those of which the alkyl chain contains up to ca. 18 carbon atoms, for example the halides, sulfates, phosphates or acetates, or mixtures of two or more thereof.

Examples of ampholytic surfactants are long-chain substituted amino acids, such as N-alkyl-di(aminoethyl)glycine or N-alkyl-2-aminopropionic acid salts, betaines, such as N-(3-acylamidopropyl)-N,N-dimethyl ammonium salts with a $C_{8-18}$ acyl group or alkyl imidazolium betaines.

The quantities mentioned above also apply largely to component B providing the limitations in regard to the solubility of the polysaccharides or polysaccharide derivatives after components A and B have been combined are observed.

According to the invention, a suitable component A comprises, for example,
ca. 10% by weight to 40% by weight of a polymerizate insoluble, but dispersible, in water
ca. 0% by weight to ca. 20% by weight fillers
ca. 5% by weight to 70% by weight water
ca. 1% by weight to 50% by weight of a water-soluble polysaccharide or a mixture of two or more water-soluble polysaccharides and
ca. 1 to 6% by weight of a metal salt.

In a particular embodiment, a suitable component A comprises, for example,
ca. 12% by weight to 25% by weight or ca. 15 to ca. 22% by weight of a polymerizate insoluble, but dispersible, in water ca. 0% by weight to ca. 10% by weight fillers
ca. 15% by weight to 60% by weight or ca. 25% by weight to ca. 58% by weight water
ca. 10% by weight to 40% by weight or ca. 15% by weight to ca. 25% by weight of a water-soluble polysaccharide or a mixture of two or more water-soluble polysaccharides and
ca. 2% by weight to ca. 5% by weight or ca. 3% by weight to ca. 4.5% by weight of a metal salt.

According to the invention, it is of advantage, but not absolutely necessary, for both component A and component B to have adhesive properties of their own. In another embodiment of the present invention, however, the early tack of the two-component assembly adhesive is also high when water is added to component A as sole component B.

In a preferred embodiment of the present invention, component B comprises, for example, ca.
0% by weight to ca. 70% by weight of a polymerizate insoluble, but dispersible, in water,
0% by weight to ca. 50% by weight of a filler,
0.1% by weight to ca. 5% by weight of a thickener (for example water-soluble polysaccharide),
ca. 29.9% by weight to ca. 99.9% by weight water.

In a particularly preferred embodiment of the present invention, component B comprises, for example, ca.
15% by weight to ca. 55% by weight or ca. 25% by weight to ca. 40% by weight of a polymerizate insoluble, but dispersible, in water,
15% by weight to ca. 40% by weight or ca. 25% by weight to ca. 38% by weight of a filler,
1% by weight to ca. 4.5% by weight or ca. 2% by weight to ca. 4% by weight of a thickener (for example water-soluble polysaccharide),
ca. 30% by weight to ca. 60% by weight or ca. 31% by weight to ca. 45% by weight water.

A two-component assembly adhesive according to the invention may have a ratio of component A to component B of ca. 20:1 to ca. 1:20. However, which ratio produces the optimum result in regard to early tack also depends on the specific composition of the two components.

If component A, for example, has a very high salt content, it is of advantage to use more of component B to achieve very good early tack because high dilution results in significant dissolution of the water-soluble polysaccharides. In principle, therefore, the ratio of component A to component B is critically determined by the content of water-soluble polysaccharides and polysaccharide derivatives present after mixing of the components, the salt content and the water content. Basically, the adhesive obtained after components A and B have been mixed should have substantially the following composition:
ca. 5% by weight to ca. 30% by weight of a polymerizate insoluble, but dispersible, in water,
ca. 10% by weight to ca. 50% by weight of a filler,
ca. 1% by weight to 10% by weight of a water-soluble polysaccharide or a mixture of two or more water-soluble polysaccharides and
ca. 0.1% by weight to ca. 10% by weight other additives and
ca. 43.9% by weight to ca. 79.9% by weight water.

In another embodiment of the present invention, the ingredients of components A and B are adjusted so that a ratio of component A to component B of ca. 1:1 to ca. 1:15 can be used. This is the case, for example, when component A comprises ca. 20% by weight methyl cellulose and up to ca. 4% by weight sodium citrate.

The present invention also relates to a process for the production of an adhesive comprising the steps of preparing a component A by mixing water, a compound dissociating in water, a water-soluble polysaccharide or polysaccharide derivative or a mixture of two or more thereof, optionally a polymerizate insoluble, but dispersible, in water and optionally additives
preparing a component B by mixing water, a compound dissociating in water, a water-soluble polysaccharide or polysaccharide derivative or a mixture of two or more thereof, optionally a polymerizate insoluble, but dispersible, in water and optionally additives and
optionally mixing components A and B before application of the assembly adhesive according to the invention to the substrate surfaces to be bonded.

Component A according to the invention is prepared, for example, by mixing an aqueous polymer dispersion, preferably having a solids content of 50 to 65% by weight, a filler content of 0 to 10% by weight and preferably 2 to 5% by weight and a content of up to 4% of a suitable salt, for example sodium citrate, with ca. 20 to ca. 25% of a cellulose derivative. The component may readily be processed under the usual conditions (for example at temperatures of ca. 50 to ca. 80° C.) to form the water-containing component A according to the invention. The same applies to component B providing component B does not consist solely of water.

In general, a component A according to the invention is prepared as follows: an aqueous polymer dispersion is introduced into a mixer at 10 to 90° C. and additives such as defoamers, preservatives, thickeners (salt and methyl cellulose), emulsifiers and water and also the filler are added with stirring.

The two-component assembly adhesive according to the invention may be applied, for example, as described in the following.

The two-component assembly adhesive according to the invention has an excellent level of performance properties, such as peel strength, shear strength and heat resistance.

The early adhesive strength of an adhesive according to the invention is more than 30, preferably more than 40, more preferably more than 60 and most preferably more than 80 $g/cm^2$.

The open time should be more than 15 minutes and preferably more than 20 to at most ca. 40 minutes. An open time of less than 10 minutes is regarded as inadequate.

The two-component assembly adhesive according to the invention allows correcting movements to be made in the first 5 minutes after the surfaces to be bonded have been brought into contact.

The open time is measured as described in the following. Using a type B toothed spatula, the adhesive to be tested is applied to an FPY chipboard conditioned for at least 1 week in a standard conditioning atmosphere. Once the adhesive has been applied, a structure is started. Foam strips (8×2.5 cm) are applied to the adhesive film at two-minute intervals and rolled into the bed of adhesive with a pressure roller (3 kg). This procedure is continued until the foam strips can be wetted with the adhesive. After the adhesive has completely dried, the strength of the foam strips in the adhesive bed is evaluated. If a foam strip can be completely removed from the adhesive bed, the open time has been exceeded. The time needed to bond the preceding foam strip is recorded as the open time.

The two-component assembly adhesives according to the invention satisfy these requirements and, in addition, are distinguished by good spreadability (rheology) and unusually high ultimate strength. In addition, they are distinctly lower in emissions than corresponding solvent-based assembly adhesives.

The two-component assembly adhesive according to the invention is particularly suitable as an adhesive for bonding substrates of plastic, wood, metal, textiles of woven or unwoven fibers, screed, concrete, cement-based or gypsum-based surfacing compositions or ceramics.

Accordingly, the present invention also relates to the use of a two-component assembly adhesive according to the invention for bonding substrates of plastic, wood, metal, textiles of woven or unwoven fibers; screed, concrete, cement-based or gypsum-based surfacing compositions or ceramics.

As used herein, and in particular as used herein to define the elements of the claims that follow, the articles "a" and "an" are synonymous and used interchangeably with "at least one" or "one or more," disclosing or encompassing both the singular and the plural, unless specifically defined otherwise. The conjunction "or" is used herein in its inclusive disjunctive sense, such that phrases formed by terms conjoined by "or" disclose or encompass each term alone as well as any combination of terms so conjoined, unless specifically defined otherwise. All numerical quantities are understood to be modified by the word "about," unless specifically modified otherwise or unless an exact amount is needed to define the invention over the prior art.

EXAMPLES

1. Preparation of a Component A

Methyl cellulose ether, Na citrate and chalk were introduced into and stirred in a styrene/acrylate dispersion with a solids content of 50% by weight in the quantities listed below:

| | |
|---|---|
| 50% styrene/acrylate dispersion DS 910 (manufacturer: Rhodia) | 37% by weight |
| Thickener (type: HDK T30, manufacturer: Wacker) | 2% by weight |
| Methyl cellulose derivative | 21% by weight |
| Na citrate | 4% by weight |
| water | 36% by weight |

2. Component B

An assembly adhesive with the following composition was used as component B:

| | |
|---|---|
| Styrene/acrylate dispersion Rhoximat DS 910 (manufacturer: Rhodia) | 66% by weight |
| Chalk | 30% by weight |
| Thickener | 3% by weight |
| Pigment | 1% by weight |

Testing of Various Mixing Ratios of Component A to Component B (in % by Weight) in the Two-component System:

| No. | Component A | Component B | Early tack [g/cm$^2$] |
|---|---|---|---|
| 1 | 1 | 0 | 3 |
| 2 | 0 | 1 | 12 |
| 3 | 5 | 1 | 6 |
| 4 | 4 | 1 | 6 |
| 5 | 3 | 1 | 12 |
| 6 | 2 | 1 | 23 |
| 7 | 1 | 1 | 62 |
| 8 | 1 | 2 | 75 |
| 9 | 1 | 3 | 90 |
| 10 | 1 | 5 | 61 |
| 11 | 1 | 10 | 49 |
| 12 | 1 | 15 | 42 |
| 13 | 1 | 20 | 33 |

What is claimed is:

1. A two-component assembly adhesive comprising components A and B, wherein component A comprises:
   one or more water-soluble polysaccharides and/or polysaccharide derivatives in a quality of 0.5% to 50% by weight, based on the total weight of component A;
   water; and
   a compound dissociating in water which reduces the solubility in water of at least one water-soluble polysaccharide and/or polysaccharide derivatives present in component A;
   and component B comprises:
   water;
   optionally a compound dissociating in water which reduces the solubility in water of a water-soluble polysaccharide and/or polysaccharide derivatives present in component A; and
   optionally one or more water-soluble polysaccharide and/or polysaccharide derivative;
   wherein at least component A or component B comprises at least one water-insoluble, water-dispersible synthetic polymerizate,
   wherein the compound dissociating in water in component A has a concentration high enough to reduce the solubility of at least one of the water-soluble polysaccharides and/or polysaccharide derivatives present in component A, and
   wherein the compound dissociating in water in components A and B being has a concentration so high overall in components A and B that the solubility of at least one of the water-soluble polysaccharides and/or polysaccharide derivatives present in component A after components A and B have been combined is higher than in component A alone.

2. The adhesive of claim 1, wherein component A comprises a total of 1% to 25% by weight of the one or more polysaccharides or polysaccharide derivatives.

3. The adhesive of claim 2, wherein the polysaccharides or polysaccharide derivatives is selected from one or more of celluloses, cellulose derivatives, starch, or starch derivatives.

4. The adhesive of claim 3, wherein at least one of the compounds dissociating in water comprises one or more compounds selected from the group consisting of halides, carbonates, hydrogen carbonates, phosphates, phosphites, sulfates, sulfites, citrates, formats, and acetates.

5. The adhesive of claim 4, wherein component A comprises from 1% to 10% by weight of the compound dissociating in water, based on the total weight of component A.

6. The adhesive of claim 5, comprising a styrene(meth) acrylate copolymer as the water-insoluble, water-dispersible polymerizate.

7. The adhesive of claim 1, wherein component A comprises:
   10% to 40% by weight of the one or more water-insoluble, water-dispersible polymerizates;
   0% to 20% by weight of one or more fillers;
   5% to 70% by weight water;
   1% to 50% by weight of one or more water-soluble polysaccharides or polysaccharides derivates; and
   1% to 6% by weight of one or more metal salts.

8. The adhesive of claim 1, wherein component B comprises:
- 0% to 70% by weight of one or more water-insoluble, water-dispersible polymerizates;
- 0% to 50% by weight of one or more fillers;
- 0.1% to 5% by weight of one or more thickeners; and
- 29.9% to 99.9% by weight water.

9. A process for the production of a two-component assembly adhesive, comprising the steps of:
- preparing a component A by mixing water, a compound dissociating in water, a water-soluble polysaccharide or polysaccharide derivative or a mixture of two or more thereof, optionally a water-insoluble, water-dispersible polymerizate, and optionally additives;
- preparing a compound B by mixing water, optionally a compound dissociating in water, optionally a water-soluble polysaccharide or polysaccharide derivative or a mixture of two or more thereof, optionally a water-insoluble, water-dispersible polymerizate, and optionally additives; and
- optionally mixing components A and B before the application of the assembly adhesive according to the invention to a substrate surface to be bonded.

10. The process of claim 9, wherein components A and B are applied to separate substrate surfaces to be bonded and are only mixed with one another when the substrate surfaces to be bonded are brought into contact with one another.

* * * * *